(12) United States Patent
Roger et al.

(10) Patent No.: US 11,077,326 B2
(45) Date of Patent: Aug. 3, 2021

(54) HARNESS

(71) Applicant: ZEDEL, Crolles (FR)

(72) Inventors: Benoît Roger, Saint-Pancrasse (FR); Simon Emonin, Grenoble (FR)

(73) Assignee: ZEDEL, Crolles (FR)

( * ) Notice: Subject to any disclaimer, the term of this patent is extended or adjusted under 35 U.S.C. 154(b) by 239 days.

(21) Appl. No.: 16/155,002

(22) Filed: Oct. 9, 2018

(65) Prior Publication Data

US 2019/0105521 A1   Apr. 11, 2019

(30) Foreign Application Priority Data

Oct. 6, 2017 (FR) ..................... 1759410

(51) Int. Cl.
*A62B 35/00* (2006.01)
*F16B 45/04* (2006.01)

(52) U.S. Cl.
CPC ...... *A62B 35/0037* (2013.01); *A62B 35/0006* (2013.01); *A62B 35/0012* (2013.01); *A62B 35/0031* (2013.01); *F16B 45/04* (2013.01)

(58) Field of Classification Search
CPC ............ A62B 35/0043; A62B 35/0006; A62B 35/0012; A62B 35/0031
See application file for complete search history.

(56) References Cited

U.S. PATENT DOCUMENTS

| 1,642,322 | A | * | 9/1927 | Beck | ........................ F16B 45/02 |
| | | | | | 24/599.2 |
| 10,343,001 | B2 | * | 7/2019 | Seman | ............... A62B 35/0043 |
| 2017/0120087 | A1 | * | 5/2017 | Cowell | ............. A62B 35/0037 |
| 2017/0291046 | A1 | * | 10/2017 | Bouquier | ........... A62B 35/0006 |
| 2018/0071557 | A1 | * | 3/2018 | Bouquier | ........... A62B 35/0037 |
| 2018/0154196 | A1 | * | 6/2018 | Cowell | ............. A62B 35/0031 |
| 2018/0345052 | A1 | * | 12/2018 | Bouquier | ........... A62B 35/0037 |

FOREIGN PATENT DOCUMENTS

| EP | 3162411 A1 | 5/2017 |
| JP | H10-248949 A | 9/1998 |
| JP | 2001-129105 A | 5/2001 |
| WO | 2013/063384 A2 | 5/2013 |
| WO | 2016/200896 A1 | 12/2016 |

* cited by examiner

*Primary Examiner* — Alvin C Chin-Shue
(74) *Attorney, Agent, or Firm* — Oliff PLC (57) ABSTRACT

The harness includes a belt, a pair of thigh loops and first and second lateral attachment points. At least the first lateral attachment point includes a connector fixed to the belt. The connector is provided with a body defining: at least one pass-through opening inside which an attachment element to the belt passes, a connection ring distinct from the at least one pass-through opening, the connection ring being closed by means of a closing element fitted in removable manner. The closing element and the body define at least one through hole distinct from the at least one pass-through opening and from the connection ring. The closing element separate the connection ring and the at least one through hole.

9 Claims, 9 Drawing Sheets

HARNESS

FIELD OF THE INVENTION

The invention relates to a harness comprising a connector configured for ease of simultaneous attachment and use of several safety accessories.

STATE OF THE ART

In the scope of his professional activity, a rope access technician or a person performing work at height may be called on to use a multitude of equipment items, and in particular a descender, a lanyard or a rope clamp, successively using one and another of the items of equipment.

In the field of tree pruning, the ropes and the attachment points move around and up and down the tree trunk as the pruner progresses. Furthermore, it is conventional practice to use a lifeline which passes around the tree trunk or which is fixed to the tree trunk in order to be able to place oneself in a comfortable position to work more efficiently than with a single substantially vertical rope.

When performing pruning work, it is necessary to move continuously from one side of the trunk to the other and to move away from and towards the trunk. To facilitate the job of pruning, it is known to use a harness which is provided with two lateral attachment points located on each side of the sagittal plane of the user. In conventional manner, the attachment points are integrated in the belt of the harness. A rope passes around the trunk and each of the ends of the rope is fixed to one of the two attachment points of the harness.

It is apparent that, on an everyday basis, this configuration presents numerous drawbacks which complicate tree pruning work. For example, the assembly formed by the attachment points and the rope takes up a great deal of space, which means that the amplitude of movement to one side or the other of the tree is limited thereby making it necessary to modify the attachment point and/or to work in a fully extended position, i.e. in an uncomfortable position.

As an alternative to the attachment point fitted on the belt, harnesses also exist where the attachment point is located between the belt and the thigh straps. In conventional manner, the attachment point is formed by a ring which can be opened in order to be able to insert a rope forming a lifeline.

It is also apparent that both these configurations can give rise to problems of ergonomy or even to safety problems in case of improper use.

OBJECT OF THE INVENTION

One object of the invention consists in remedying these drawbacks, and in providing a harness comprising a lateral attachment point making for ease of use and enabling a greater amplitude of movement as well as providing enhanced safety.

This object tends to be achieved by means of a harness which comprises a belt, a pair of thigh loops and first and second lateral attachment points. The harness is remarkable in that at least the first lateral attachment comprises a connector fixed at least to the belt, the connector comprising a closing element fixed to a body.

The connector is provided with a body defining at least one pass-through opening inside which an attachment element to the belt passes. The closing element is fitted removable with respect to the body. The closing element and the body define a connection ring distinct from the at least one pass-through opening. The connection ring is closed when the closing element is fixed to the body. The closing element and the body define at least one through hole distinct from the at least one pass-through opening and from the connection ring. The closing element separate the connection ring and the at least one through hole.

In one development, the closing element and body define at least two through holes distinct from the at least one pass-through opening and from the connection ring. The closing element separate the connection ring and the at least two through holes, the at least two through holes being aligned in a direction perpendicular to the longitudinal axis of the belt.

In a particular embodiment, the at least one through hole is partially defined by a groove in the body and a groove in the closing element.

In advantageous manner, the body possesses a first cavity collaborating with one end of the closing element so that said end of the closing element is inserted in the cavity to close the connection ring.

Preferentially, the body possesses a second cavity collaborating with a pass-through opening of the closing element so that the second cavity is in the extension of the pass-through opening when the closing element close the connection ring.

In an advantageous embodiment, the second cavity and the pass-through opening are arranged to enable a clamp to be inserted in a direction of insertion perpendicular to the direction of insertion of the closing element in the second cavity.

It is advantageous to provide for the harness to comprise a wire part having a first end which is secured to the first connector by means of the at least one through hole, the second end of the wire part being secured to the second lateral attachment point.

In an advantageous embodiment, the wire part has a first part having a smaller cross-section than the cross-section of the at least one through hole so as to be inserted in said at least one through hole and a second part having a larger cross-section than the cross-section of the at least one through hole so as to form a blocking stop, the blocking stop being separated from the second lateral attachment point by the connector of the first lateral attachment point.

Preferentially, the body defines a first pass-through opening fixed to the belt by a first attachment element and a first pass-through opening fixed to a thigh loop by a first attachment element.

In another development, the second lateral attachment element comprises a connector secured at least to the belt, the connector being provided with a body defining:
  at least one pass-through opening inside which an attachment element to the belt passes,
  a connection ring distinct from the at least one pass-through opening, the connection ring being closed by means of a closing element mounted in removable manner,
and in which the closing element and the body define at least one through hole distinct from the at least one pass-through opening and from the connection ring, the closing element separating the connection ring and the at least one through hole.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF A PREFERRED EMBODIMENT OF THE INVENTION

Figure 11:
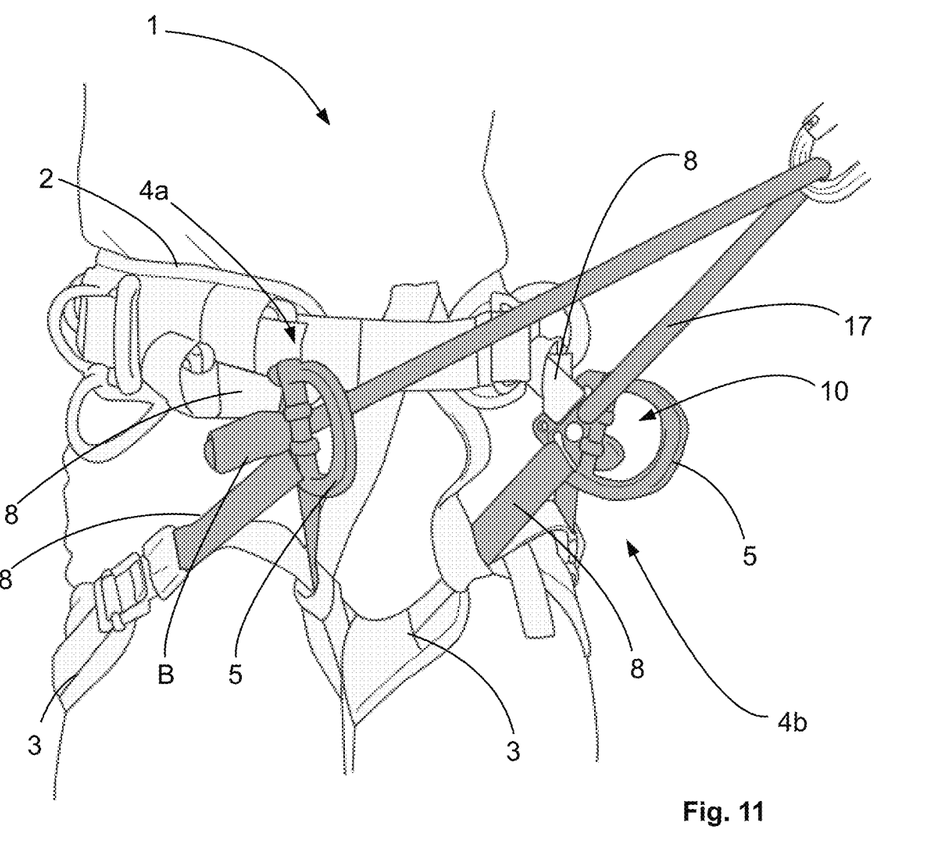
FIG. 11 represents, in schematic manner, a harness equipped with two lateral attachment points provided with a connector and a wire part.
Figure 12:
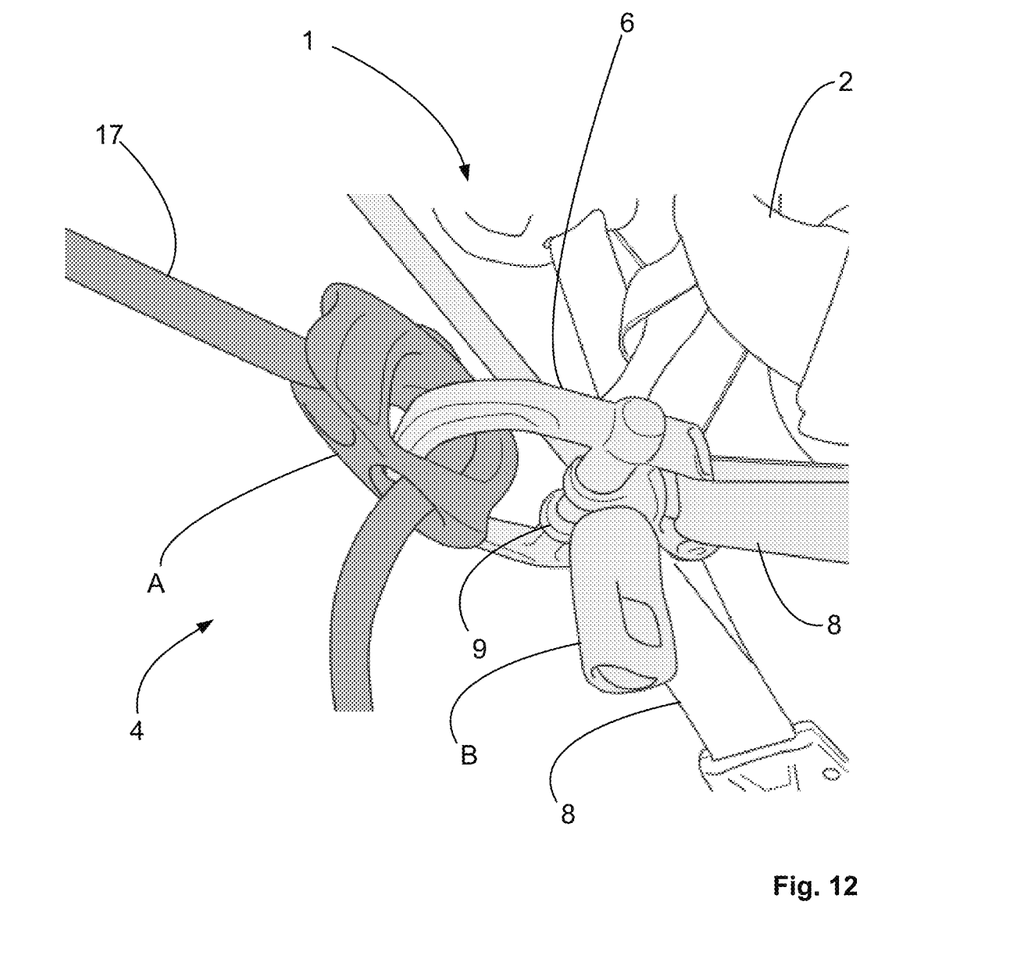
FIG. 12 represents, in schematic manner, an enlarged view of lateral attachment point on a harness.

As illustrated in FIGS. 11 and 12, a harness 1 according to the invention comprises a belt 2 and a pair of thigh loops 3, and is designed to be associated with a pair of shoulder straps fitted in removable or unremovable manner on the belt 2.

The harness 1 may comprise a ventral suspension point which is configured to make the mechanical connection between an anchoring point and the belt 2 of the harness 1 when the user is suspended in the harness 1. The harness 1 can also comprise a dorsal attachment point in association with shoulder straps.

In order to facilitate work at height and in particular pruning work, the harness 1 is provided with two lateral attachment points 4a and 4b which are arranged on each side of the sagittal plane of the user. The harness 1 therefore has a first lateral attachment point 4a and a second lateral attachment point 4b which can be irrespectively a right attachment point or a left attachment point.

The first and second lateral attachment points 4a and 4b are fixed at least to the belt 2. In one embodiment, the lateral attachment points 4a and 4b are fixed to the belt 2 in unremovable manner. It is also possible to provide for the attachment points 4a and 4b or at least one of the attachment points to be fitted in removable manner with respect to the belt 2.

As illustrated in FIGS. 1 to 14, the attachment point 4 which can be the first attachment point 4a and/or second attachment point 4b comprises a connector 5 which is fixed to the belt 2. The connector 5 is provided with a body 6 defining at least one pass-through opening 7 inside which an attachment element 8 to the belt 2 passes. The attachment element 8 is formed for example by one or more straps which are fixed or define the belt 2.

In the illustrated embodiment, the connector has two pass-through openings 7 which are respectively connected to the belt 2 and to a thigh strap 3. The second attachment element 8 is for example formed by one or more straps which are fixed or define a thigh loop 3. This configuration makes it possible to achieve a better distribution of the forces between the user's pelvis and legs.

This configuration also enables the user to distribute his weight better.

It is particularly advantageous to define a pass-through opening 7 for each attachment element 8 instead of a single opening accommodating both the attachment element 8 as this enables the forces to be better distributed and the movement of the connector 5 with respect to the belt 2 and thigh strap 3 to be better defined.

In the illustrated embodiment, the two pass-through openings 7 are curved and the radius of curvature is directed towards the attachment point, i.e. to move away from the belt 2. It is also apparent that it is particularly advantageous to provide for the two pass-through openings 7 to substantially define an arc of a circle. This configuration enables a better rotation of the connector 5 in order to follow the user's movements.

The connector 5 also comprises a closing element 9 which is fitted in removable manner with the body 6. In other words, the closing element 9 can be fixed to the body 6 and can also be removed. In one embodiment, the body 6 and closing element 9 are made from metallic material, for example from steel or aluminium alloy.

The body 6 and closing element 9 define the periphery of a connection ring 10. The connection ring 10 is distinct from the at least one pass-through opening 7, i.e. from the attachment area between the belt 2 and connector 5. In this way, the gear that is fitted in the connection ring 10 does not impede fixing to the belt 2 and impair its mobility. This also makes it possible to perform partial disassembly of the connector 5 without interrupting the mechanical connection with the belt 2 and possibly the thigh loop 3. This also prevents the connector 5 from being refitted incorrectly, for example in a position which causes premature wear of the attachment element 8.

The connection ring 10 is a closed ring closing of which is performed by fixing of the closing element 9 with the body 6. When the closing element 9 is not fixed to the body 6, the connection ring 10 is not closed. This configuration enables an item of gear to be fitted and removed simply by removing the closing element 9. For example purposes, FIG. 12 illustrates fitting of a rope clamp A in a connection ring 10. The fitted gear advantageously has a pass-through opening which collaborates with the periphery of the connection ring 10 which avoids having to use an additional connector of carabiner or shackle type. Safety is improved by eliminating a superfluous part and the gear is fitted as close as possible to the user thereby limiting the space occupation of the lateral attachment point 4. The item of gear can also be a textile item defining a sewn loop. As the loop is sewn, safety can be improved compared with a knot tied by the user.

The closing element 9 and body 6 also define at least one through hole 11 distinct from the at least one pass-through opening 7 and from the connection ring 10. The closing element 9 is arranged in such a way as to separate the connection ring 10 and the at least one through hole 11. As previously, the through hole 11 is defined by means of a closed ring which is formed partially by the body 6 and partially by the closing element 9.

The connector 5 defines at least three distinct holes 7, 10 and 11 which enable the connector 5 to be functionalized.

Figure 1:
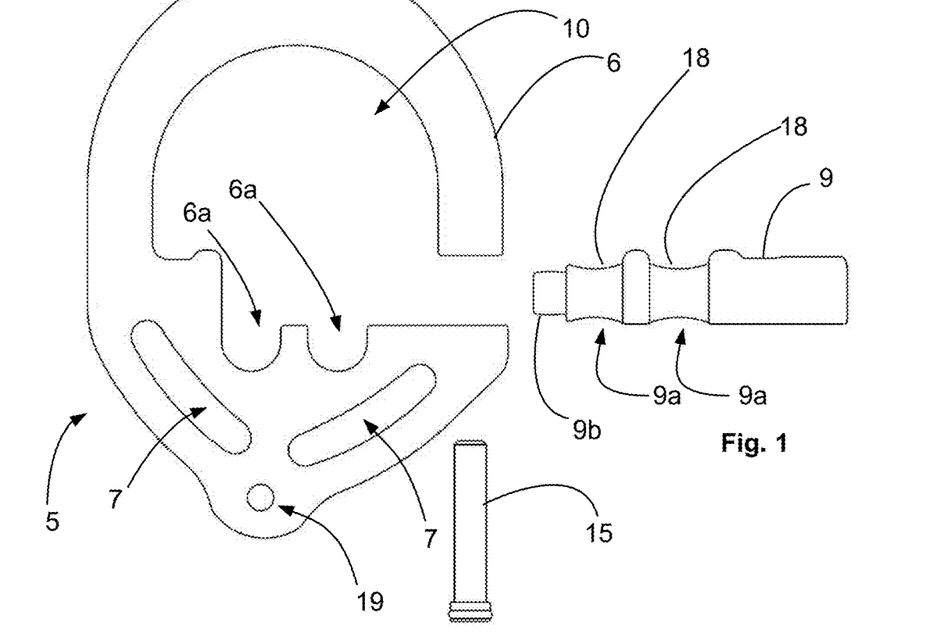
FIGS. 1 and 2 represent a first embodiment of a connector with a body separated from the closing element, in schematic manner, in top view and in ¾ view.
Figure 2:
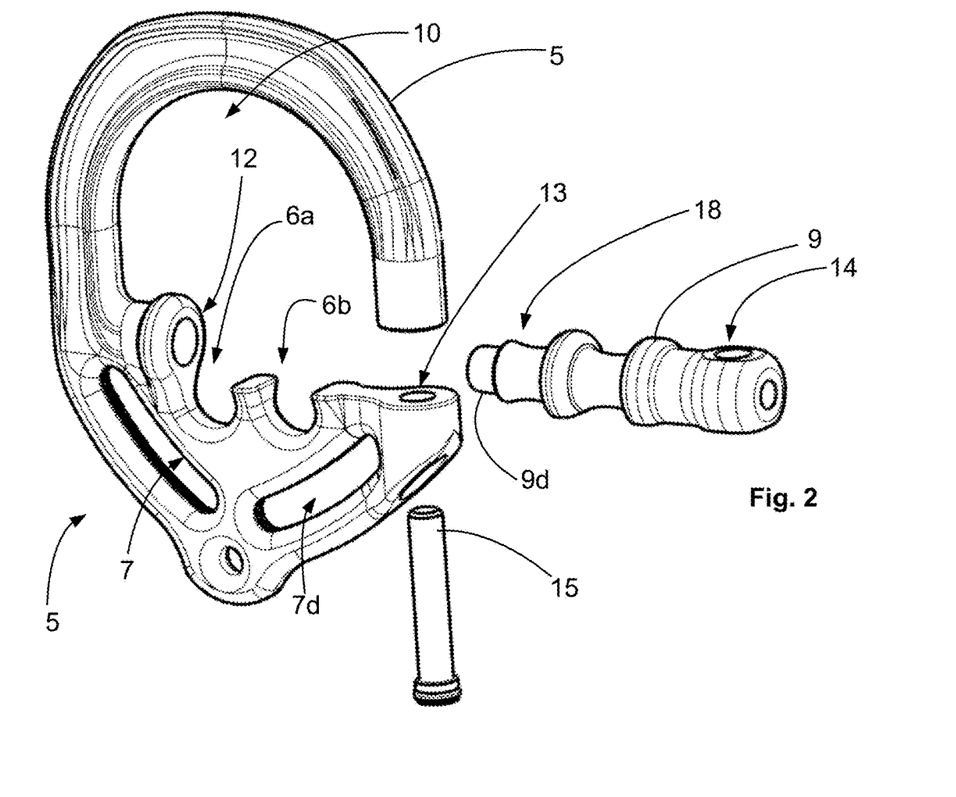
Figure 3:
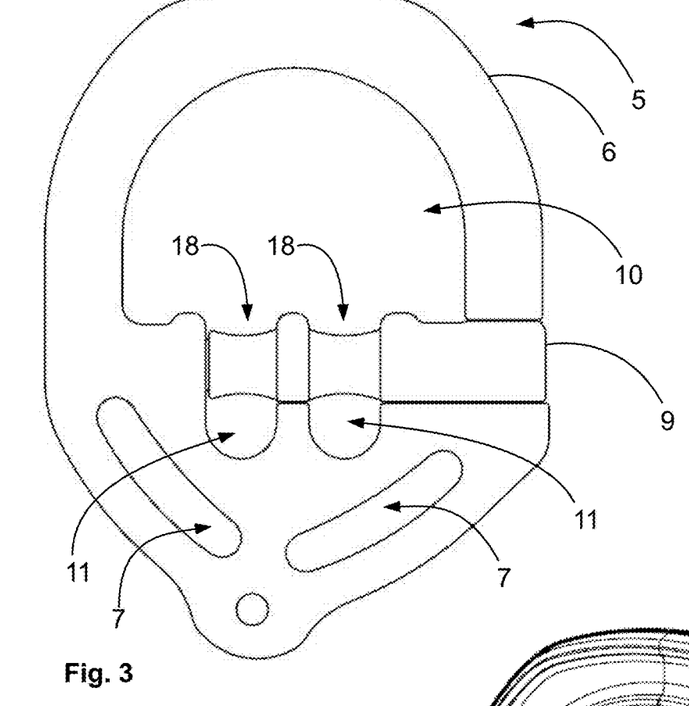
FIGS. 3 and 4 represent a closing element fixed to the body according to the first embodiment, in schematic manner, in top view and in ¾ view.
Figure 4:
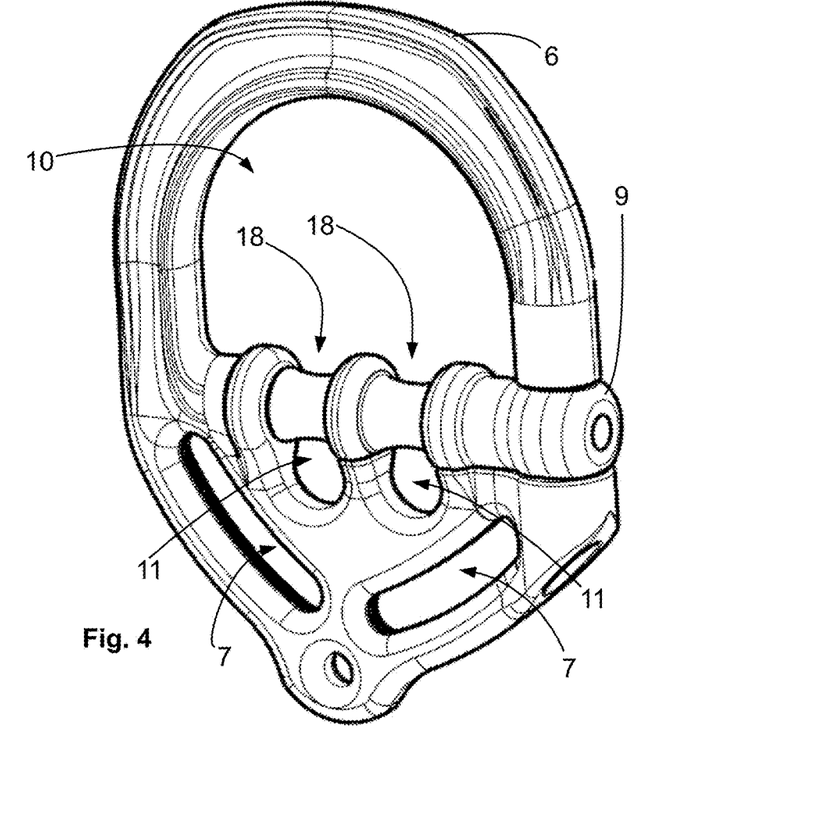
Figures 8, 9:
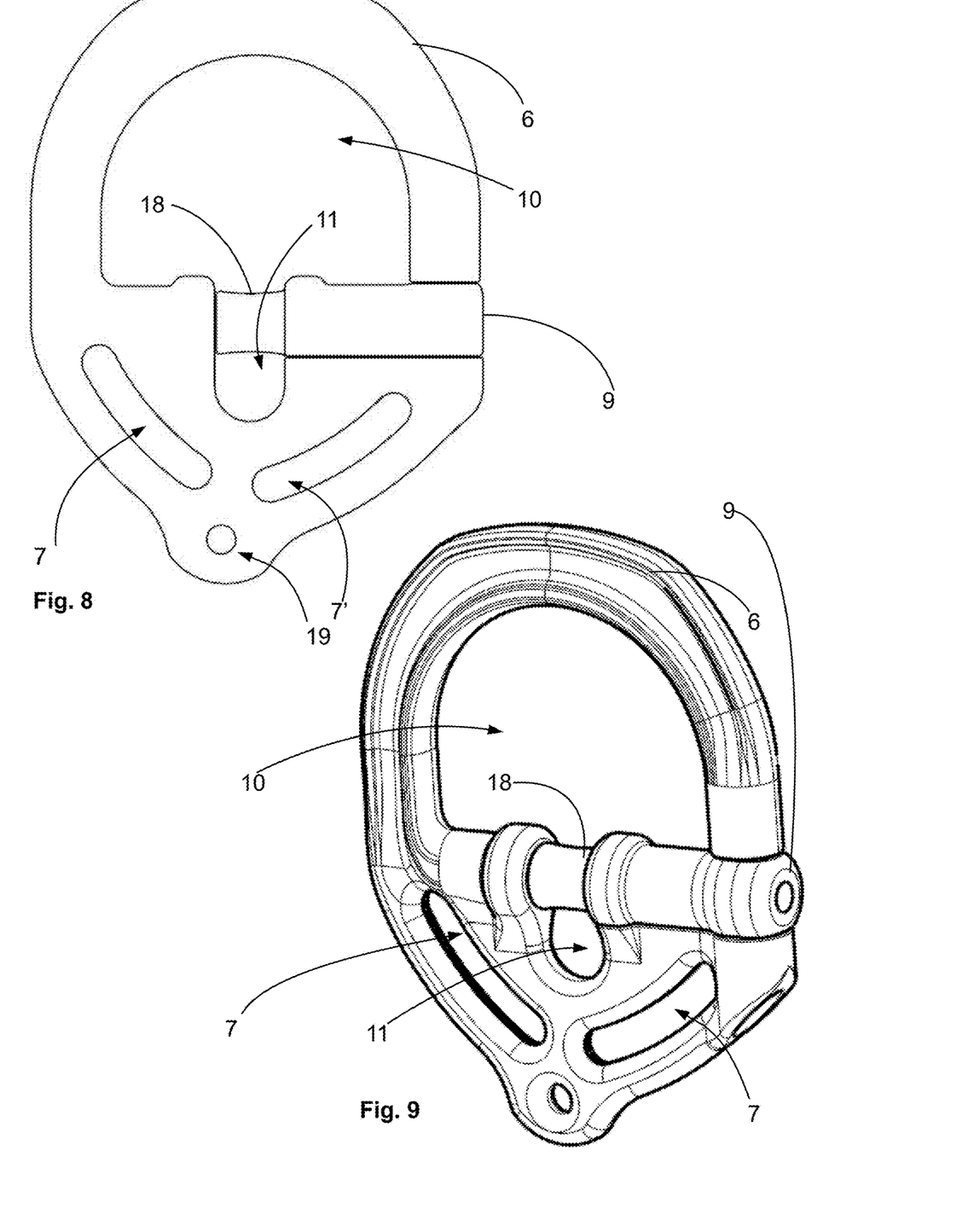
FIGS. 8 and 9 represent a closing element fixed to the body according to the second embodiment, in schematic manner, in top view and in ¾ view.

In an advantageous embodiment illustrated in FIG. 3 and in FIG. 8, the through hole 11 is located between the pass-through opening 7 and connection ring 10. In even more advantageous manner, the pass-through opening 7, through hole 11 and connection ring 10 are aligned.

In the embodiment illustrated in FIGS. 1 to 5, the closing element 9 and body 6 define at least two through holes 11 distinct from the at least one pass-through opening 7 and from the connection ring 10. In the illustrated embodiment, only two holes 11 are defined in the connector 5. The closing element 9 separates the connection ring 10 and the through holes 11. In particularly advantageous manner, the through holes 11 are aligned in a direction perpendicular to the longitudinal axis of the belt 2. As the holes 11 have a circular or substantially circular cross-section, the axis joining the centres of the circles is parallel to the transverse axis of the belt 2.

In even more advantageous manner, the axis joining the centres of the circles is parallel to an axis of rotation of the connector 5 with respect to the belt 2. The axis of rotation of the connector is defined by the pass-through openings 7 and the associated connection parts 8.

It is particularly advantageous to provide for the through hole or holes 11 to be defined partially in the body 6 and partially in the closing element 9 in order to facilitate insertion of an item of gear in the through hole 11.

For example purposes, the through hole or holes 11 are partially defined by a groove 6a in the body 6 and a groove 9a in the closing element 9. The groove preferentially presents a cross-section in the form of an arc of a circle, for example in the form of a semi-circle. However in order to facilitate insertion of an item of gear in the through hole 11, it is particularly advantageous to provide for the majority of the through hole 11 to be defined in the body 6.

It is then possible to fit an item of gear, for example a rope forming a lifeline, in the through hole 11. As illustrated in FIGS. 11 and 12, the item of gear has a blocking stop B preventing fitting or removal of the gear without removing the closing element 9. This solution provides increased safety in comparison with a through hole defined completely in the body meaning that the user has to tie a knot at the end of the rope.

In a particularly advantageous embodiment that is illustrated in FIGS. 1 to 10, the body 6 has a first cavity 12 collaborating with one end 9b of the closing element 9 so that said end 9b of the closing element 9 is inserted in the cavity 12 to close the connection ring 10. The first cavity 12 can be a blind hole as represented in the different figures, but it is also possible to use a through hole or a plurality of salient elements. In this configuration, the body 6 has a cavity 12 which collaborates with one end 9b of the closing element 9 in order to impose a movement in a single direction to close the connection ring 10.

In this way, when a force is applied by an item of gear located in the through hole 11, a part of this force applied on the closing element 9 is taken up by the cavity 12 formed in the body 6 and therefore by the body 6.

In the embodiment illustrated in FIGS. 1 to 10, the through hole or holes 11 are located between the first cavity 12 of the body 6 which collaborates with the end of the closing element 9 and the other end of the closing element 9 which is also fixed to the body 6 in order to close the connection ring 10. In this way, the forces applied on the closing element 9 by any item of gear located in a through hole 11 are better taken up by the body 6.

Figure 5:
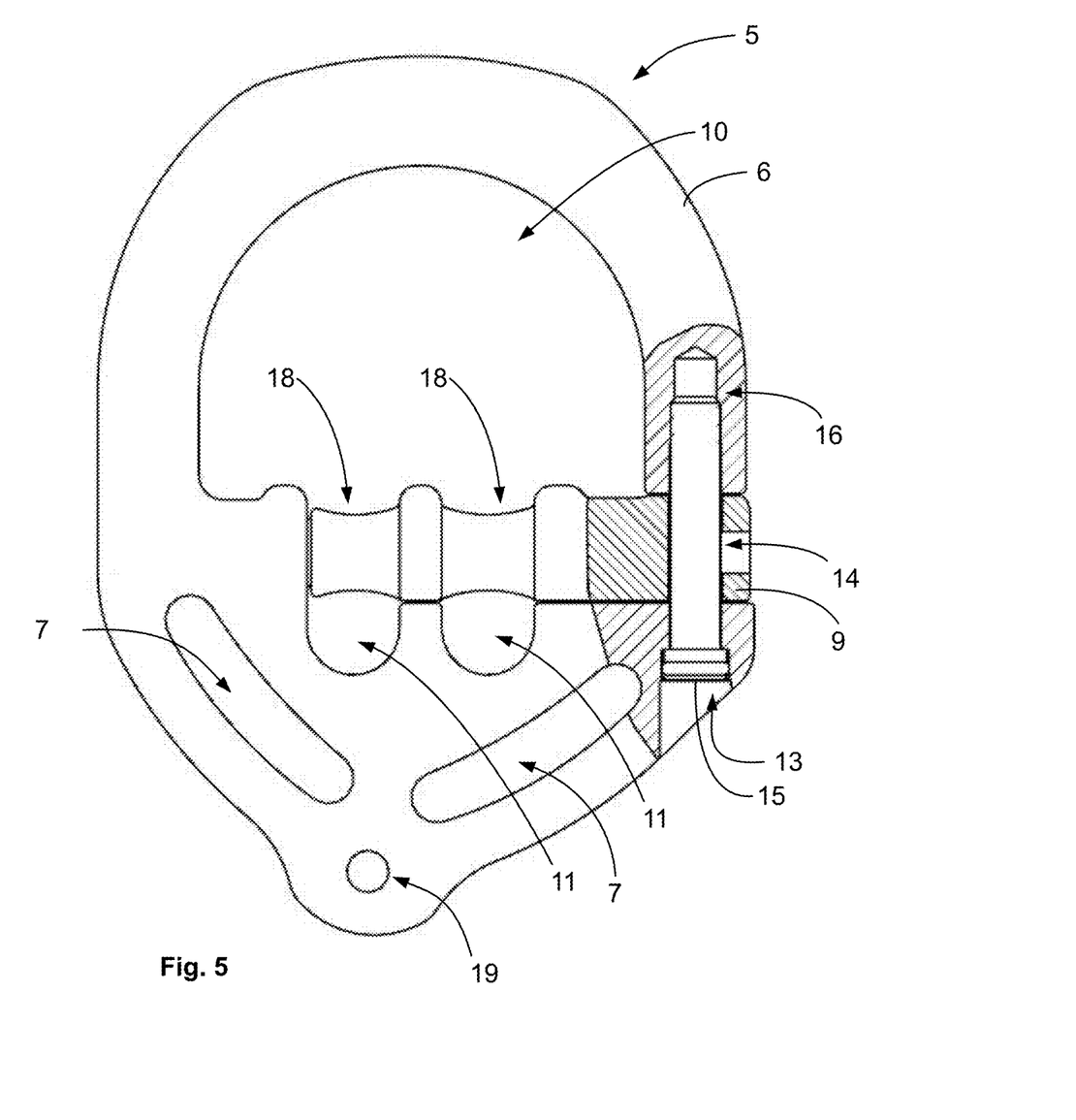
FIG. 5 represents, in schematic manner, a closing element fixed to the body according to the first embodiment with a cross-sectional view for fixing of the closing element with the body of the connector.
Figure 6:
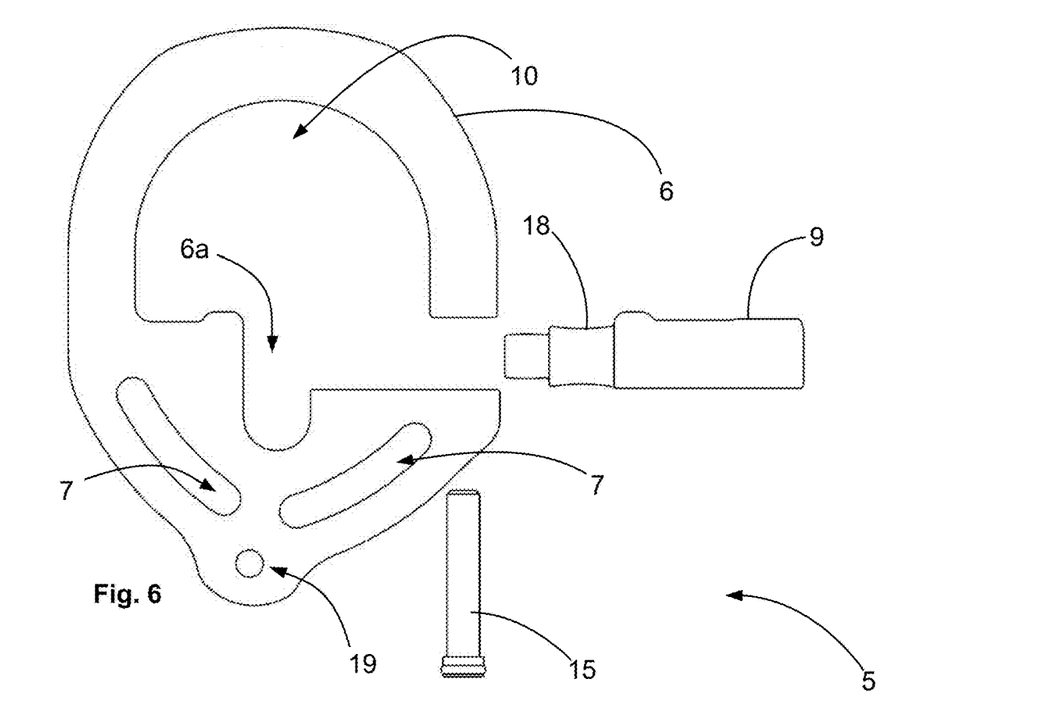
FIGS. 6 and 7 represent a second embodiment of a body separated from the closing element, in schematic manner, in top view and in ¾ view.
Figure 7:
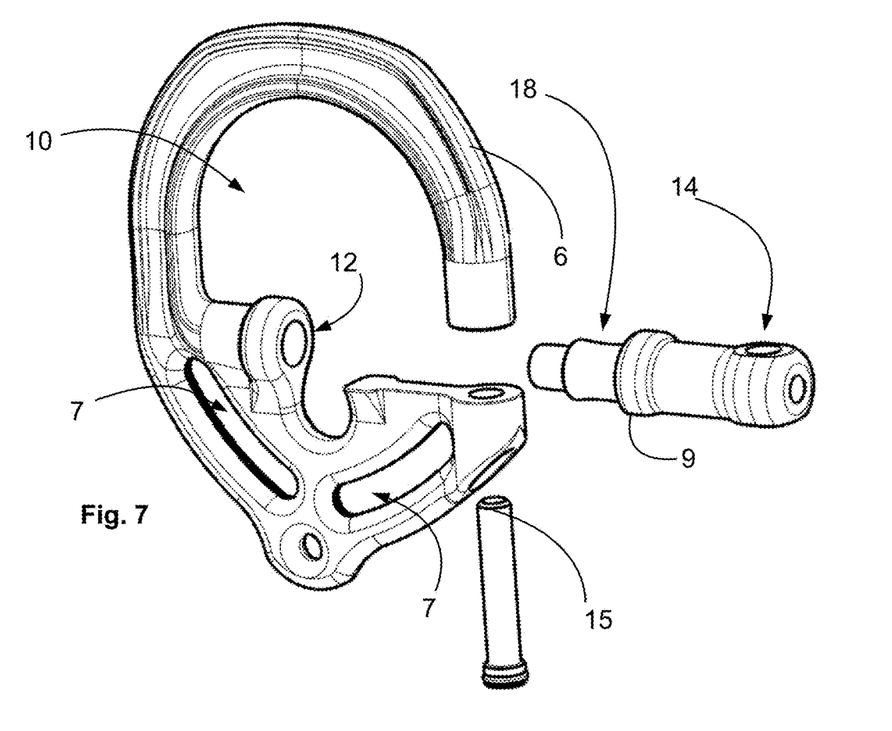
Figure 10:
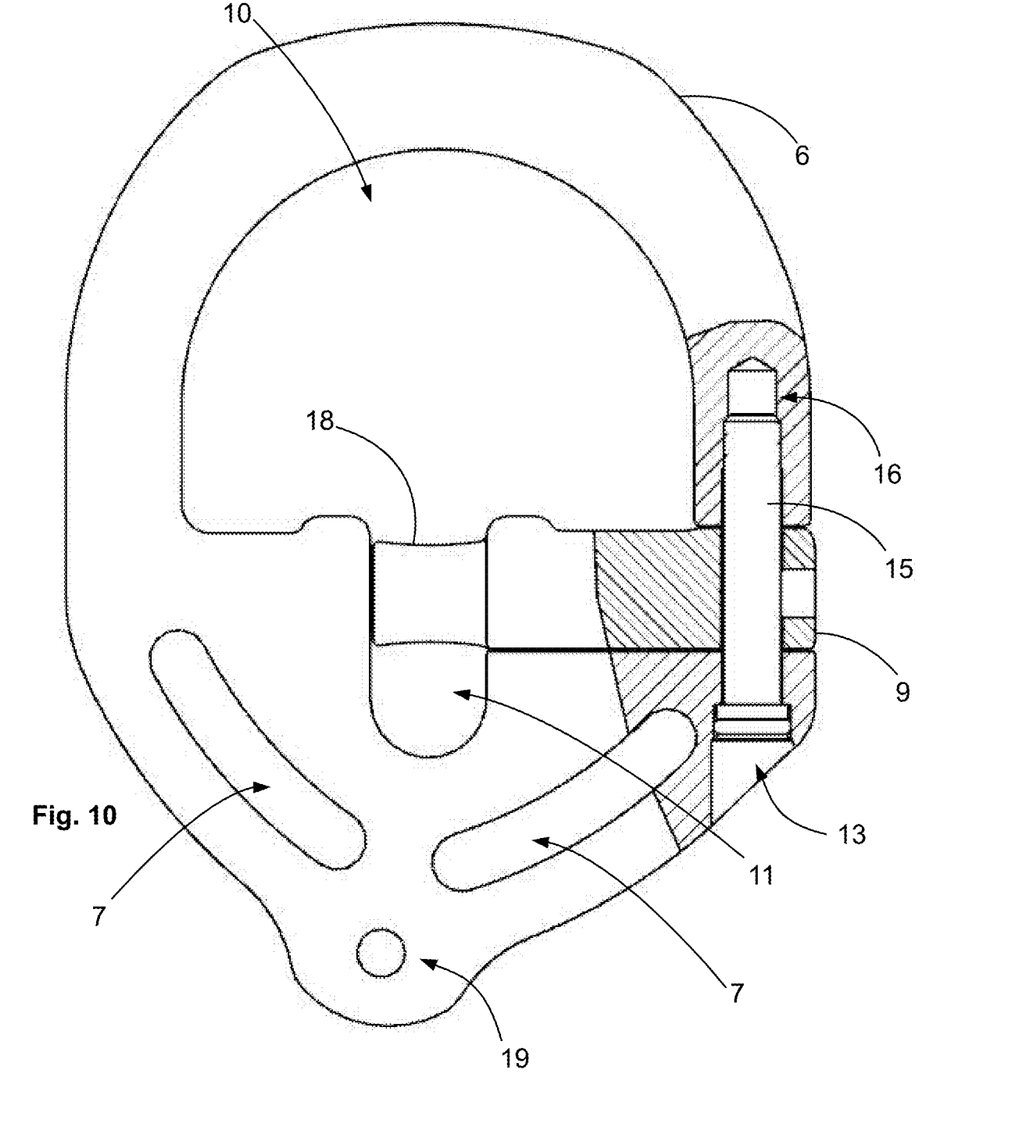
FIG. 10 represents, in schematic manner, a closing element fixed to the connector according to the second embodiment with a cross-sectional view for fixing of the closing element with the body of the connector.

It is also advantageous to provide for the body 6 to have a cavity 13 which is configured to collaborate with a cavity 14 of the closing element 9 so that the second cavity 13 is in the extension of the cavity 14 when the closing element 9 close the connection ring 10. As illustrated in FIGS. 5 and 10, the body 6 has a through cavity 13 opening into the contact area with the closing element 9. The closing element 9 also has a cavity 14 which comes to face the through cavity 13 of the body 6 enabling insertion of a clamp 15 preventing the closing element 9 from being removed.

In advantageous manner illustrated in FIGS. 5 and 10, the body 6 has a second cavity 16 which is advantageously not a pass-through cavity and which is located in the alignment of the cavity 13 and of the pass-through cavity 14 of the closing element 9 thereby enabling the clamp 15 to be inserted in the body 6 on each side of the closing element 9.

This configuration enables the clamp 15 to be better secured in the connector 5. Preferentially, a thread is formed in at least one of the cavities of the body 6 and operates in association with a thread of the clamp 15. The clamp can be a screw bolt, but other embodiments are possible.

In a particular embodiment, the second cavity 13 and the pass-through opening 14 of the closing element 9 are arranged to enable a clamp 15 to be inserted in a direction of insertion which is perpendicular to the direction of the insertion of the closing element 9 in the first cavity 12. This embodiment is illustrated in FIGS. 5 and 10.

In particularly advantageous manner, the clamp 15 is configured to prevent removal of the closing element and to ensure the mechanical continuity of the body 6. It is particularly advantageous to provide for the clamp 15 to have a mechanical support with the body on each side of the closing element, i.e. in the cavities 13 and 16 to enhance the strength of the connection ring 10.

As illustrated in FIGS. 11 and 12, the body 6 and closing element 9 collaborate with a wire part 17 which is inserted in at least one of the through holes. The wire part 17 can be rope or a strap. In advantageous manner, the wire part 17 has a circular cross-section and the through hole 11 also present a circular cross-section which facilitates use of the wire part 17.

The first lateral attachment point 4a comprises a wire part 17 having a first end which is fixed to the connector 5 by means of the at least one through hole 11. The second end of the wire part 17 is fixed to the second lateral attachment point 4b.

In particularly advantageous manner, the wire part 17 has a first part having a cross-section that is smaller than or equal to the cross-section of the at least one through hole 11 so as to be inserted in said at least one through hole 11. The wire part 17 also has a second part having a larger cross-section than the cross-section of the at least one through hole 11 so as to form a blocking stop B. The blocking stop B is separated from the second lateral attachment point 4b by the first lateral attachment point 4a.

In this configuration, the blocking stop is fitted as close as possible to the connector 5 thereby limiting the space occupation of the first lateral attachment point 4a.

In advantageous manner, the blocking stop B is devoid of any knot or comprises a sewn knot in order to enhance safety without increasing the space occupation.

It is particularly advantageous to provide for the second lateral attachment point 4b to be formed by a connector 5 comprising the technical features presented in the foregoing. In one embodiment, the two connectors 5 are strictly identical.

In the embodiment illustrated in FIG. 11 and which can also be used in the embodiment of FIG. 12, the two ends of the wire part 17 are formed by an unremovable stop. For example, the stop is formed by a stitched seam, for example a knot rendered unremovable by means of a seam or a fold of the sewn wire part. This configuration enables safety to be greatly enhanced by eliminating the possibility of forming a knot at one end of the wire part as the knot can be modified in time.

Figures 13, 14:
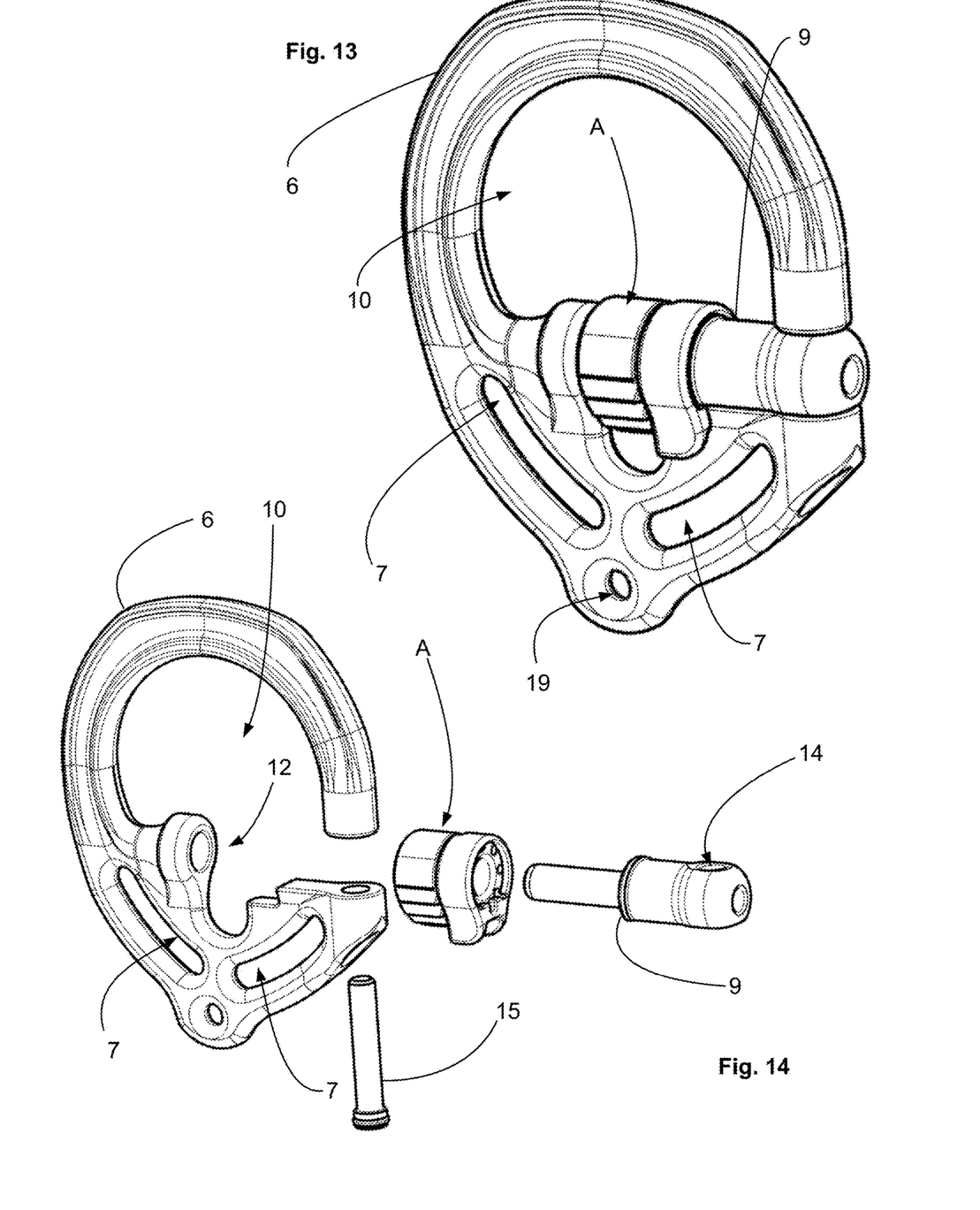
FIGS. 13 and 14 represent, in schematic manner in ¾ view, a closing element fixed to the body and separated from the body according to any embodiment comprising a rope clamp.

In an alternative embodiment, the body 6 or the closing element 9 of one of the connectors 5 comprises a wire part clamp (not represented) in the embodiment illustrated in FIGS. 13 and 14. The wire part clamp is advantageously a cam-based clamp the cam of which is fitted on a pivot pin. The pivot pin can be identical to the longitudinal axis of the closing element 9 if the cam is fitted on the closing element 9. As an alternative, the pivot pin can be integrated in the body 6 if the cam-based clamp is fitted in the body 6.

It is particularly advantageous to form the cam-based clamp in the closing element 9 as the functionality can be installed or removed by simply replacing the closing element 9 by a closing element 9 comprising the cam-based clamp or not.

The use of a cam-based clamp is particularly advantageous as the clamp is configured to block the wire part 17 and is advantageously configured to be self-blocking on account of the shape of the cam and/or by means of a spring which is configured to apply a pressure on the wire part 17. In this way, the wire part 17 is blocked and the length of the wire part 17 is fixed.

In so far as the cam is integrated in the connector 5, the space occupation of the attachment point is minimal and the user can take advantage of the whole of the available length of rope between the two attachment points. In the prior art, it was necessary to make a knot at one end of the wire part 17 or to attach the wire part 17 by means of a shackle or a carabiner. The other end could be fixed to a clamp which was itself fixed to the attachment point by a carabiner or a shackle. It is clearly apparent that the distance between the edge of the belt 2 and the useful end of the wire part 17 is relatively large which complicates the user's job.

The connector 5 enables the usable length of wire part 17 to be increased by improving the integration of the wire part 17 in the first lateral attachment point. An equivalent result can be achieved for the second attachment point or can even be further enhanced by integrating a clamp of the wire part 17 directly in the connector 5.

It is naturally possible to fit a rope clamp at each securing point. In the embodiment illustrated in FIG. 12, a rope clamp is fitted in the connection ring after the closing element 9 has been removed. It is also possible to provide for the through hole 11 to be configured to allow insertion of the clamp A of FIG. 12. The clamp is then fitted rotating around the closing element 9.

It is also advantageous to provide for the closing element to define a groove 18 around the closing element 9 in the extension of the through hole 11. This groove enables a better interaction between the wire part 17 and connector 5. In advantageous manner, the closing element 9 has a groove which passes right round the closing element, i.e. in the extension of groove 9a.

It is particular advantageous to locate the through hole 11 close to the pivot pin of the lateral attachment point 4 as this facilitates use of the attachment point when the user is secured by the lifeline which is attached to the through hole 11. The connection ring 10 is pulled forwards by the tension on the lifeline without being impeded by the lifeline.

In the embodiment illustrated in FIG. 11, the two connection rings 10 are easily accessible outside the space occupied by the lifeline.

The embodiment illustrated in FIG. 11 presents a connector 5 defining two pass-through openings 7 one of which is associated with a wire part and the other of which is left free. It is advantageous to use the second pass-through opening 7 with a second wire part which is fixed to a second connector. The user can then use two different attachment points with two different lifelines, thereby making his everyday work easier. The second wire part can have the same features as the first wire part.

In the different embodiments illustrated, the body 6 is provided with an attachment part 19 for attaching a seat support. The seat support is not illustrated. The seat support attachment part 19 is represented by a hole provided in the bottom part of the body. It is particularly advantageous to use an attachment part 19 which is located between the two pass-through openings 7 and preferably at equal distance from the two pass-through openings 7 and even more preferentially in a plane of symmetry of the two pass-through openings 7 so that when the user seats himself on the seat support, he does not modify the orientation of the connectors, and that the user's movements around his attachment point do not result in him sliding off the seat support.

In the illustrated embodiments, the attachment part 19 is a hole which is designed to collaborate with a connector such as for example a carabiner or a shackle, or with a rope or a strap. It is particularly advantageous to use a carabiner or a shackle if the seat support is to be able to be dismantled. For a fixed use, it is possible to use a rope or a strap.

In an alternative embodiment, the hole 19 can be replaced by a salient area which can be in the shape of a hook. However, such a configuration is less advantageous as the salient part can catch on the user or on a branch.

The configuration proposed enables a very good alignment to be achieved between the seat and connector 5 without disturbing the interaction between the connector 5 and the wire part thereby ensuring that the user is secured to his attachment point.

The invention claimed is:

1. A harness comprising:
   a belt,
   a pair of thigh loops; and
   first and second lateral attachment points, wherein:
   at least the first lateral attachment point comprises a connector fixed to the belt, the connector being provided with a body, a clamp and a closing element,
   the body defines a hook and at least one pass-through opening inside which an attachment element to the belt passes, the at least one-pass-through opening being distinct from the hook,
   the body defines two aligned cavities in two opposite ends of the hook,
   the closing element closes the hook and is mounted removable with respect to the body,
   the closing element defines a cavity, the cavity of the closing element being aligned with the two aligned cavities of the body when the closing element closes the hook,
   the clamp connects the two aligned cavities of the body and passes through the cavity of the closing element when the closing element closes the hook, and
   the closing element and the body define:
   a connection ring defining a connection opening distinct from the at least one pass-through opening, the connection ring being closed by means of the closing element fitted in removable manner, the connecting ring being partly delineated by the body and partly delineated by the closing element, at least one through hole distinct from the at least one pass-through opening and from the connection opening, the closing element separating the connection opening and the at least one through hole, the at least one through hole being partly delineated by the body and partly delineated by the closing element, and the body has a first cavity perpendicular to the two aligned cavities and one end of the closing element enters the first cavity so that the end of the closing element is inserted in the first cavity when the closing element closes the hook to define the connection ring.

2. The harness according to claim 1, wherein the closing element and the body define at least two through holes distinct from the at least one pass-through opening and from the connection ring, the closing element separating the connection ring and the at least two through holes, each of the at least through holes being partly delineated by the body and partly delineated by the closing element.

3. The harness according to claim 2, wherein the at least two through holes are aligned in a perpendicular direction to the longitudinal axis of the belt.

4. The harness according to claim 1, wherein the at least one through hole is defined partially by a groove in the body and partially by a groove in the closing element.

5. The harness according to claim 1, wherein the body has a first cavity and one end of the closing element enters the first cavity so that said end of the closing element is inserted in the first cavity when the closing element closes the hook to define the connection ring.

6. The harness according to claim 1, wherein the first lateral attachment point comprises a wire part having a first end which is fixed to the connector by means of the at least one through hole, the second end of the wire part being fixed to a second lateral attachment point.

7. The harness according to claim 6, wherein the wire part has a first part having a smaller cross-section than the cross-section of the at least one through hole so as to be inserted in said at least one through hole and a second part having a larger cross-section than the cross-section of the at least one through hole so as to form a blocking stop, the blocking stop being separated from the second lateral attachment point by the connector of the first lateral attachment point.

8. The harness according to claim 1, wherein the at least one pass-through opening comprises a first pass-through opening fixed to the belt by a first attachment element and a second pass-through opening fixed to a thigh strap by a first attachment element.

9. The harness according to claim 1, wherein the second lateral attachment point comprises a connector fixed to the belt, the connector of the second lateral attachment point being provided with a body defining:

at least one pass-through opening inside which an attachment element to the belt passes, a connection ring distinct from the at least one pass-through opening, the connection ring being closed by means of a closing element fitted in removable manner, and wherein the closing element and the body define at least one through hole distinct from the at least one pass-through opening and from the connection ring, the closing element separating the connection ring and the at least one through hole.

* * * * *